United States Patent
Cai et al.

(10) Patent No.: US 11,372,130 B2
(45) Date of Patent: Jun. 28, 2022

(54) CALIBRATION METHOD FOR ROTATING ACCELEROMETER GRAVITY GRADIOMETER

(71) Applicant: SOUTHEAST UNIVERSITY, Nanjing (CN)

(72) Inventors: Tijing Cai, Nanjing (CN); Mingbiao Yu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/421,383

(22) PCT Filed: May 30, 2019

(86) PCT No.: PCT/CN2019/089236
§ 371 (c)(1),
(2) Date: Jul. 8, 2021

(87) PCT Pub. No.: WO2020/164206
PCT Pub. Date: Aug. 20, 2020

(65) Prior Publication Data
US 2022/0091299 A1    Mar. 24, 2022

(30) Foreign Application Priority Data

Feb. 15, 2019 (CN) .......................... 201910117180.4

(51) Int. Cl.
*G01V 13/00* (2006.01)
*G01P 15/18* (2013.01)
*G01V 7/02* (2006.01)

(52) U.S. Cl.
CPC .............. *G01V 13/00* (2013.01); *G01P 15/18* (2013.01); *G01V 7/02* (2013.01)

(58) Field of Classification Search
CPC ............ G01V 13/00; G01V 7/02; G01P 15/18
See application file for complete search history.

(56) References Cited

U.S. PATENT DOCUMENTS

| 5,339,684 A | 8/1994 | Jircitano et al. |
| 2005/0022402 A1* | 2/2005 | Ash ........................ E21B 47/022 33/321 |
| 2022/0075091 A1* | 3/2022 | Cai .......................... G01P 15/18 |

FOREIGN PATENT DOCUMENTS

| CN | 105717553 A | 6/2016 |
| CN | 108931824 A | 12/2018 |

(Continued)

*Primary Examiner* — Bryan Bui
(74) *Attorney, Agent, or Firm* — Bayramoglu Law Offices LLC (57) ABSTRACT

Disclosed is a calibration method for a rotating accelerometer gravity gradiometer, wherein linear motion error coefficients, angular motion error coefficients, self-gradient model parameters and scale factors of the rotating accelerometer gravity gradiometer are calibrated once by changing linear motion, angular motion, and self-gradient excitations of the rotating accelerometer gravity gradiometer. The calibrated linear and angular motion error coefficients are used for compensating for motion errors of the gravity gradiometer online, and the calibrated self-gradient model parameters are used for self-gradient compensation. The calibration method provided by the present invention is easy to operate and not limited by any calibration site, thereby being suitable for programmed self-calibration and realizing an important engineering value.

1 Claim, 2 Drawing Sheets

(56) References Cited

FOREIGN PATENT DOCUMENTS

| CN | 109212620 A | 1/2019 |
|---|---|---|
| CN | 109709628 A | 5/2019 |

\* cited by examiner

CALIBRATION METHOD FOR ROTATING ACCELEROMETER GRAVITY GRADIOMETER

CROSS REFERENCE TO THE RELATED APPLICATIONS

This application is the national phase entry of International Application No. PCT/CN2019/089236, filed on May 30, 2019, which is based upon and claims priority to Chinese Patent Application No. 201910117180.4, filed on Feb. 15, 2019, the entire contents of which are incorporated herein by reference.

TECHNICAL FIELD

The present invention relates to a calibration method for a rotating accelerometer gravity gradiometer, belonging to the field of a precision measurement technology.

BACKGROUND

Moving-base gravity gradient exploration is a gravity field exploration technology with a low cost and a high efficiency, Gravity gradient data has been extensively applied to geological analysis, gravity field modeling, high-precision navigation and resource exploration. The gravity gradiometer is extremely important for civil use, national defense and scientific research. The existing mainstream gravity gradiometers under study both at home and abroad mainly include a cold atom gravity gradiometer, a superconducting gravity gradiometer, an MEMS gravity gradiometers and a rotating accelerometer gravity gradiometer. Among them, the rotating accelerometer gravity gradiometers, the most mature one, has been put into commercial operation. Until now, the gravity gradiometer technology has been in the engineering prototype research stage in China.

During the moving-base gravity gradient exploration, the acceleration, angular velocity and angular acceleration thereof are output to the gravity gradiometer to cause a measurement error due to the installation error, mismatching of first-order scale factor, mismatching of a circuit gain, and high-order non-linear error coefficient of an accelerometer within the gravity gradiometer. Each of outputs excited by the acceleration, the angular velocity and the angular acceleration is much greater than an output excited by the gravitational gradient, which will saturate or damage a circuit of the gravity gradiometer. Hence, the rotating accelerometer gravity gradiometer needs online compensation for motion errors. For the online motion error compensation system of the gravity gradiometer, setting of initial values of the linear and angular motion error coefficients is required. Components of the gravity gradiometer system, including stable platform and carrier, will generate the gravitational gradient to interfere with the measurement on the gravitational gradient of a target object. The gravitational gradient generated from the components thereof is called self-gradient. Before the gravity gradient exploration, the self-gradient model parameter is calibrated; during the exploration, the attitudes of the gravity gradiometer are recorded, a self-gradient model is used, and a self-gradient is calculated and compensated. The motion error coefficients, the scale factors and the self-gradient model parameters of the gravity gradiometer are parameters to be calibrated by the gravity gradiometer.

SUMMARY

The present invention provides a calibration method for a rotating accelerometer gravity gradiometer. The method comprises the steps of, based on an analytical model and a self-gradient model of the rotating accelerometer gravity gradiometer, changing linear motion, angular motion and self-gradient excitations of the gravity gradiometer while calibrating, recording outputs of the gravity gradiometer, and rapidly calibrating motion error coefficients, scale factors and self-gradient model parameters of the gravity gradiometer once. The calibrated motion error coefficients of the gravity gradiometer are used for setting parameters in an online motion error compensation system of the rotating accelerometer gravity gradiometer, and the calibrated self-gradient model parameter is used for self-gradient compensation for the gravity gradiometer. The present invention provides the calibration method for the rotating accelerometer gravity gradiometer which has the foregoing effects and solves the foregoing problems.

The calibration method for the rotating accelerometer gravity gradiometer comprises the following steps:

(1) applying linear and angular motions to the rotating accelerometer gravity gradiometer, and meanwhile continuously changing the attitudes of the gravity gradiometer, and recording linear motions ($a_x, a_y, a_z$), angular motions ($\omega_x, \omega_y, \omega_z, \omega_{ax}, \omega_{ay}, \omega_{az}$), the attitudes ($\theta_x, \theta_y, \theta_z$) and an output ($G_{out}$) of the gravity gradiometer as calibrated data, wherein start time for the calibrated data is $t_1$, end time is $t_p$, and the linear motion data of the gravity gradiometer is as follows:

$$\begin{cases} a_x = [a_x(t_1), \ldots, a_x(t), \ldots, a_x(t_p)]^T \\ a_y = [a_y(t_1), \ldots, a_y(t), \ldots, a_y(t_p)]^T \\ a_z = [a_z(t_1), \ldots, a_z(t), \ldots, a_z(t_p)]^T \end{cases}$$

where, $a_x$ represents acceleration data in an X direction of a measurement coordinate system of the gravity gradiometer, and $a_x(t_1)$ represents an acceleration in the X direction of the measurement coordinate system of the gravity gradiometer at the time $t_1$; $a_x(t)$ represents an acceleration in the X direction of the measurement coordinate system of the gravity gradiometer at time t; $a_x(t_2)$ represents an acceleration in the X direction of the measurement coordinate system of the gravity gradiometer at the time $t_2$; $a_y$ represents acceleration data in a Y direction of the measurement coordinate system of the gravity gradiometer, and $a_y(t_1)$ represents an acceleration in the Y direction of the measurement coordinate system of the gravity gradiometer at the time $t_1$; $a_y(t)$ represents an acceleration in the Y direction of the measurement coordinate system of the gravity gradiometer at the time t; $a_y(t_2)$ represents an acceleration in the Y direction of the measurement coordinate system of the gravity gradiometer at the time $t_2$; $a_z$ represents acceleration data in a Z direction of the measurement coordinate system of the gravity gradiometer, and $a_z(t_1)$ represents an acceleration in the Z direction of the measurement coordinate system of the gravity gradiometer at the time $t_1$; $a_z(t)$ represents an acceleration in the Z direction of the measurement coordinate system of the gravity gradiometer at the time t; $a_z(t_2)$ represents an acceleration in the Z direction of the measurement coordinate system of the gravity gradiometer at the time $t_2$; where, $[\cdot]^T$ represents transposed operation; the angular motion data of the gravity gradiometer is as follows:

$$\begin{cases} \omega_x = [\omega_x(t_1), \ldots, \omega_x(t), \ldots, \omega_x(t_p)]^T \\ \omega_y = [\omega_y(t_1), \ldots, \omega_y(t), \ldots, \omega_y(t_p)]^T \\ \omega_z = [\omega_z(t_1), \ldots, \omega_z(t), \ldots, \omega_z(t_p)]^T \end{cases}$$

$$\begin{cases} \omega_{ax} = [\omega_{ax}(t_1), \ldots, \omega_{ax}(t), \ldots, \omega_{ax}(t_p)]^T \\ \omega_{ay} = [\omega_{ay}(t_1), \ldots, \omega_{ay}(t), \ldots, \omega_{ay}(t_p)]^T \\ \omega_{az} = [\omega_{az}(t_1), \ldots, \omega_{az}(t), \ldots, \omega_{az}(t_p)]^T \end{cases}$$

where, $\omega_x$ represents angular velocity data in the X direction of the measurement coordinate system of the gravity gradiometer, $\omega_x(t_1)$ represents an angular velocity in the X direction of the measurement coordinate system of the gravity gradiometer at the start time $t_1$, $\omega_x(t)$ represents an angular velocity in the X direction of the measurement coordinate system of the gravity gradiometer at the time t; $\omega_x(t_p)$ represents an angular velocity in the X direction of the measurement coordinate system of the gravity gradiometer at the end time $t_p$;

$\omega_y$ represents angular velocity data in the Y direction of the measurement coordinate system of the gravity gradiometer, $\omega_y(t_1)$ represents an angular velocity in the Y direction of the measurement coordinate system of the gravity gradiometer at the start time $t_1$, $\omega_y(t)$ represents an angular velocity in the Y direction of the measurement coordinate system of the gravity gradiometer at the time t, and $\omega_y(t_p)$ represents an angular velocity in the Y direction of the measurement coordinate system of the gravity gradiometer at the end time $t_p$;

$\omega_z$ represents angular velocity data in the Z direction of the measurement coordinate system of the gravity gradiometer, $\omega_z(t_1)$ represents an angular velocity in the Z direction of the measurement coordinate system of the gravity gradiometer at the start time $t_1$, $\omega_z(t)$ represents an angular velocity in the Z direction of the measurement coordinate system of the gravity gradiometer at the time t, and $\omega_z(t_p)$ represents an angular velocity in the Z direction of the measurement coordinate system of the gravity gradiometer at the end time $t_p$;

$\omega_{ax}$ represents angular acceleration data in the X direction of the measurement coordinate system of the gravity gradiometer, $\omega_{ax}(t_1)$ represents an angular acceleration in the X direction of the measurement coordinate system of the gravity gradiometer at the start time $t_1$, $\omega_{ax}(t)$ represents an angular acceleration in the X direction of the measurement coordinate system of the gravity gradiometer at the time t, and $\omega_{ax}(t_p)$ represents an angular acceleration in the X direction of the measurement coordinate system of the gravity gradiometer at the end time $t_p$; $\omega_{ay}$ represents angular acceleration data in the Y direction of the measurement coordinate system of the gravity gradiometer, $\omega_{ay}(t_1)$ represents an angular acceleration in the Y direction of the measurement coordinate system of the gravity gradiometer at the start time $t_1$, $\omega_{ay}(t)$ represents an angular acceleration in the Y direction of the measurement coordinate system of the gravity gradiometer at the time t, and $\omega_{ay}(t_p)$ represents an angular acceleration in the Y direction of the measurement coordinate system of the gravity gradiometer at the end time $t_p$; $\omega_{az}$ represents angular acceleration data in the Z direction of the measurement coordinate system of the gravity gradiometer, $\omega_{az}(t_1)$ represents an angular acceleration in the Z direction of the measurement coordinate system of the gravity gradiometer at the start time $t_1$, $\omega_{az}(t)$ represents an angular acceleration in the Z direction of the measurement coordinate system of the gravity gradiometer at the time t, and $\omega_{az}(t_p)$ represents an angular acceleration in the Z direction of the measurement coordinate system of the gravity gradiometer at the end time $t_p$; the attitude data of the gravity gradiometer is as follows:

$$\begin{cases} \theta_x = [\theta_x(t_1), \ldots, \theta_x(t), \ldots, \theta_x(t_p)]^T \\ \theta_y = [\theta_y(t_1), \ldots, \theta_y(t), \ldots, \theta_y(t_p)]^T \\ \theta_z = [\theta_z(t_1), \ldots, \theta_z(t), \ldots, \theta_z(t_p)]^T \end{cases}$$

where, $\theta_x$ represents attitude angle data of a rotation around the X axis, $\theta_x(t_1)$ represents an attitude angle of the rotation around the X axis at the start time $t_1$, $\theta_x(t)$ represents an attitude angle of the rotation around the X axis at the time t, and $\theta_x(t_p)$ represents an attitude angle of the rotation around the X axis at the end time $t_p$; $\theta_y$ represents attitude angle data of a rotation around the Y axis, $\theta_y(t_1)$ represents an attitude angle of the rotation around the Y axis at the start time $t_1$, $\theta_y(t)$ represents an attitude angle of the rotation around the X axis at the time t, and $\theta_y(t_p)$ represents an attitude angle of the rotation around the X axis at the end time $t_p$; $\theta_z$ represents attitude angle data of a rotation around the Z axis, $\theta_z(t_1)$ represents an attitude angle of the rotation around the Z axis at the start time $t_1$, $\theta_z(t)$ represents an attitude angle of the rotation around the Z axis at the time t, and $\theta_z(t_p)$ represents an attitude angle of the rotation around the Z axis at the end time $t_p$;

output data of the gravity gradiometer is as follows:

$$G_{out} = [G_{out}(t_1), \ldots, G_{out}(t), \ldots, G_{out}(t_p)]$$

where, $G_{out}$ is the output data of the gravity gradiometer, $G_{out}(t_1)$ represents an output of the gravity gradiometer at the start time $t_1$, $G_{out}(t)$ represents an output of the gravity gradiometer at the time t, and $G_{out}(t_p)$ represents an output of the gravity gradiometer at the time $t_p$;

(2) calibrating a linear motion error coefficient vector $C_m$, an angular motion error coefficient vector $C_A$ and a scale factor $k_{ggi}$ of the rotating accelerometer gravity gradiometer based on the following formula;

(2-1). calculating linear and angular motion vectors at all times based on the following formula:

$$L_m(t) = \begin{bmatrix} a_x(t)a_y(t)\sin 2\Omega t + 0.5(a_x^2(t) - a_y^2(t))\cos 2\Omega t \\ a_x(t)a_y(t)\cos 2\Omega t - 0.5(a_x^2(t) - a_y^2(t))\sin 2\Omega t \\ a_x(t)\sin\Omega t - a_y(t)\cos\Omega t \\ a_y(t)\sin\Omega t + a_x(t)\cos\Omega t \\ a_x(t)a_z(t)\sin\Omega t - a_y(t)a_z(t)\cos\Omega t \\ a_y(t)a_z(t)\sin\Omega t + a_x(t)a_z(t)\cos\Omega t \\ 0.5(a_x^2(t) + a_y^2(t)) \\ a_z^2(t) \\ a_z(t) \\ 1 \end{bmatrix},$$

-continued $$L_a(t) = \begin{bmatrix} -0.5(\omega_x^2(t) - \omega_y^2(t))\sin 2\Omega t + \omega_x(t)\omega_y(t)\cos 2\Omega t \\ \omega_x(t)\omega_y(t)\sin 2\Omega t + 0.5(\omega_x^2(t) - \omega_y^2(t))\cos 2\Omega t \\ \omega_x(t)\omega_z(t)\sin\Omega t - \omega_y(t)\omega_z(t)\cos\Omega t \\ \omega_y(t)\omega_z(t)\sin\Omega t + \omega_x(t)\omega_z(t)\cos\Omega t \\ \omega_{ax}(t)\sin\Omega t - \omega_{ay}(t)\cos\Omega t \\ \omega_{ay}(t)\sin\Omega t + \omega_{ax}(t)\cos\Omega t \\ \omega_{az}(t) \\ 0.5(\omega_x^2(t) + \omega_y^2(t) + 2\omega_z^2(t)) \end{bmatrix}$$

where, $L_m(t)$ represents a linear motion vector at the time t, $L_a(t)$ represents an angular motion vector at the time t, and $a_x(t), a_y(t), a_z(t)$ represents a linear motion data at the time t; $\omega_x(t), \omega_y(t), \omega_z(t), \omega_{ax}(t), \omega_{ay}(t),$ and $\omega_{az}(t)$ represent angular motion data at the time t, and $\Omega$ represents an angular frequency of a rotating disc of the rotating accelerometer gravity gradiometer;

(2-2). substituting the linear motion vectors and the angular motion vectors at all times into the following formula to calculate a motion matrix L;

$$L = \begin{bmatrix} L_m(t_1), \ldots, L_m(t), \ldots L_m(t_p) \\ L_a(t_1), \ldots, L_a(t), \ldots L_a(t_p) \end{bmatrix}$$

where, $L_m(t_1)$ represents a linear motion vector at the start time $t_1$, $L_m(t)$ represents a linear motion vector at the time t, and $L_m(t_p)$ represents a linear motion vector at the end time $t_p$; $L_a(t_1)$ represents an angular motion vector at the start time $t_1$, $L_a(t)$ represents an angular motion vector at the time t, and $L_a(t_p)$ represents an angular motion vector at the end time $t_p$;

(2-3). Calibrating the linear motion error coefficient vector $C_m$ and the angular motion error coefficient vector $C_A$ based on the following formula, wherein $C_m$ is 1×10 vectors, and $C_A$ is 1×8 vectors:

$$[C_m, C_A] = G_{out} \cdot L^+$$

where, $G_{out}$ is an output of the rotating accelerometer gravity gradiometer, and $L^+$ represents a generalized inverse of the matrix L; the scale factor $k_{ggi}$ of the gravity gradiometer is equal to a first element of the angular motion error coefficient vector $C_A$, namely $k_{ggi} = C_A(1)$;

(3) Calibrating a self-gradient model parameter based on the following formula:

(3-1). Calculating modulation vectors at all times based on the following formula $$C_{ref}(t) = [\sin 2\Omega t, \cos 2\Omega t]$$

$C_{ref}(t)$ represents a modulation vector at the time t;

(3-2). Substituting the attitude data into the following formula to calculate attitude characteristic parameters at all times;

$$\begin{cases} a_{1,1}(t) = c^2\theta_y(t), a_{1,2}(t) = 0, a_{1,3}(t) = -2c\theta_y(t)s\theta_y(t), a_{1,4}(t) = -1, a_{1,5}(t) = 0, \\ a_{1,6}(t) = s^2\theta_y(t), a_{1,7}(t) = c^2\theta_y(t), a_{1,8}(t) = 2c\theta_y(t)s\theta_y(t)s\theta_x(t), \\ a_{1,9}(t) = -2c\theta_x(t)c\theta_y(t)s\theta_y(t), a_{1,10} = -c^2\theta_x(t) + s^2\theta_x(t)s^2\theta_y(t), \\ a_{1,11} = -2c\theta_x s\theta_x s^2\theta_y(t) - 2c\theta_x(t)s\theta_x(t), a_{1,12} = c^2\theta_x(t)s^2\theta_y(t) - s^2\theta_x(t) \\ a_{1,13}(t) = -c\theta_y(t)s\theta_x(t)s\theta_y(t)s2\theta_z(t) + 0.5[c^2\theta_x(t) + c^2\theta_y(t) - s^2\theta_x(t)s^2\theta_y(t)]c2\theta_z(t) \\ -0.5[c^2\theta_x(t)s^2\theta_y(t) - s^2\theta_x(t)] \\ a_{1,14}(t) = [c^2\theta_x(t)c^2\theta_y(t) - s^2\theta_x(t)s^2\theta_y(t)]s2\theta_z(t) + 2c\theta_y(t)s\theta_x(t)s\theta_y(t)c2\theta_z(t) \\ a_{1,15}(t) = 2[c\theta_x(t)s\theta_x(t)s^2\theta_y(t) + c\theta_x(t)s\theta_x(t)]s\theta_z(t) - 2c\theta_x(t)c\theta_y(t)s\theta_y(t)c\theta_z(t) \\ a_{1,16}(t) = c\theta_y(t)s\theta_x(t)s\theta_y(t)s2\theta_z(t) + 0.5[s^2\theta_x(t)s^2\theta_y(t) - c^2\theta_x(t) - c^2\theta_y(t)]c2\theta_z(t) \\ -0.5[c^2\theta_x(t)s^2\theta_y(t) - s^2\theta_x(t)] \\ a_{1,17}(t) = -2c\theta_x(t)c\theta_y(t)s\theta_y(t)s\theta_z(t) - 2[c\theta_x(t)s\theta_x(t)s^2\theta_y(t) + c\theta_x(t)s\theta_x(t)]c\theta_z(t) \\ a_{1,18}(t) = c^2\theta_x(t)s^2\theta_y(t) - s^2\theta_x(t) \end{cases}$$

$$\begin{cases} a_{2,1}(t) = 0, a_{2,2}(t) = c\theta_y(t), a_{2,3}(t) = 0, a_{2,4}(t) = 0, a_{2,5}(t) = -s\theta_y(t), a_{2,6}(t) = 0, a_{2,7}(t) = 0, \\ a_{2,8}(t) = c\theta_x(t)c\theta_y(t), a_{2,9}(t) = c\theta_y(t)s\theta_x(t), a_{2,10}(t) = c\theta_x(t)s\theta_x(t)s\theta_y(t), \\ a_{2,11}(t) = s\theta_y(t)[s^2\theta_x(t) - c^2\theta_x(t)], a_{2,12}(t) = -c\theta_x(t)s\theta_x(t)s\theta_y(t), \\ a_{2,13}(t) = -0.5c\theta_x(t)c\theta_y(t)s2\theta_z(t) - 0.5c\theta_x(t)s\theta_x(t)s\theta_y(t)c2\theta_z(t) + 0.5c\theta_x(t)s\theta_x(t)s\theta_y(t) \\ a_{2,14}(t) = -c\theta_x(t)s\theta_x(t)s\theta_y(t)s2\theta_z(t) + c\theta_x(t)c\theta_y(t)c2\theta_z(t) \\ a_{2,15}(t) = [s\theta_y(t)c^2\theta_x(t) - s\theta_y(t)s^2\theta_x(t)]s\theta_z(t) + c\theta_y(t)s\theta_x(t)c\theta_z(t) \\ a_{2,16}(t) = 0.5c\theta_x(t)c\theta_y(t)s2\theta_z(t) + 0.5c\theta_x(t)s\theta_x(t)s\theta_y(t)c2\theta_z(t) + 0.5c\theta_x(t)s\theta_x(t)s\theta_y(t) \\ a_{2,17}(t) = c\theta_y(t)s\theta_x(t)s\theta_z(t) + [s\theta_y(t)s^2\theta_x(t) - s\theta_y(t)c^2\theta_x(t)]c\theta_z(t) \\ a_{2,18}(t) = -c\theta_x(t)s\theta_x(t)s\theta_y(t) \end{cases}$$

where, c,c² represent cos( ),cos²( ) respectively, and s,s² represent sin( ),sin²( ) respectively; $\theta_x(t),\theta_y(t),\theta_z(t)$ represents an attitude at the time t, and $a_{1,1}(t), \ldots, a_{1,18}(t), a_{2,1}(t), \ldots, a_{2,18}(t)$ are attitude characteristic parameters at the time t;

(3-3). Substituting the calculated calculate attitude characteristic parameters into the following formula to calculate attitude characteristic matrices at all times;

$$A_{attu}(t) = \begin{bmatrix} a_{1,1}(t) & \cdots & a_{1,18}(t) \\ a_{2,1}(t) & \cdots & a_{2,18}(t) \end{bmatrix}$$

where, $A_{attu}(t)$ represents an attitude characteristic matrix at the time t, and $A_{attu}(t)$ is 2×18 matrices;

(3-4). Calibrating the self-gradient model parameter of the gravity gradiometer based on the following formula:

$$P = \frac{1}{C_A(1)} \begin{bmatrix} C_{ref}(t_1)A_{attu}(t_1) \\ \vdots \\ C_{ref}(t)A_{attu}(t) \\ \vdots \\ C_{ref}(t_p)A_{attu}(t_p) \\ 1,0,0,1,0,1,0,0,0,0,0,0,0,0,0,0,0,0 \\ 0,0,0,0,0,0,1,0,0,1,0,1,0,0,0,0,0,0 \\ 0,0,0,0,0,0,0,0,0,0,0,0,1,0,0,1,0,1,0,0 \end{bmatrix}^+$$

$$\begin{bmatrix} G_{out}(t_1) - [C_m, C_A]\begin{bmatrix} L_m(t_1) \\ L_a(t_1) \end{bmatrix} \\ \vdots \\ G_{out}(t) - [C_m, C_A]\begin{bmatrix} L_m(t) \\ L_a(t) \end{bmatrix} \\ \vdots \\ G_{out}(t_p) - [C_m, C_A]\begin{bmatrix} L_m(t_p) \\ L_a(t_p) \end{bmatrix} \\ 0 \\ 0 \\ 0 \end{bmatrix}$$

where, P represents the calibrated self-gradient model parameter, $C_m$ represents the calibrated linear motion error coefficient vector in the step 2), $C_A$ is the calculated angular motion error coefficient vector in the step 2), and $C_A(1)$ is the first element of the angular motion error coefficient vector; $L_m(t_1)$ is a linear motion vector at the start time $t_1$, $L_m(t)$ is a linear motion vector at the time t, and $L_m(t_p)$ is a linear motion vector at the end time $t_p$; $L_a(t)$ is an angular motion vector at the time t, $L_a(t_1)$ is an angular motion vector at the start time $t_1$, and $L_a(t_p)$ is an angular motion vector at the end time $t_p$; $C_{ref}(t)$ is a modulation vector at the time t, $C_{ref}(t_1)$ is a modulation vector at the start time $t_1$, and $C_{ref}(t_p)$ is a modulation vector at the end time $t_p$; and $A_{attu}(t)$ is an attitude characteristic matrix at the time t, $A_{attu}(t_1)$ is an attitude characteristic matrix at the start time $t_1$, and $A_{attu}(t_p)$ is an attitude characteristic matrix at the end time $t_p$.

Beneficial effects: Compared with the prior art, the present invention has the following advantages:

The existing documents regarding the calibration of the gravity gradiometer mainly focus on calibration of the scale factors and calibration of some motion error coefficients, which are tedious in calibration process and may not calibrate all parameters once. The present invention provides the method of calibrating the scale factors, the motion error coefficient and the self-gradient model parameter once by virtue of changing linear motion, angular motion and self-gradient excitations of the gravity gradiometer. Without external quality test, the gravity gradiometer system may be used for realizing self-calibration with the aid of a computer program and is not restricted by any calibration site, so that the method is very applicable to engineering applications.

DETAILED DESCRIPTION OF THE EMBODIMENTS

The present invention will be further depicted in combination with the embodiments and the drawings.

Figure 1:
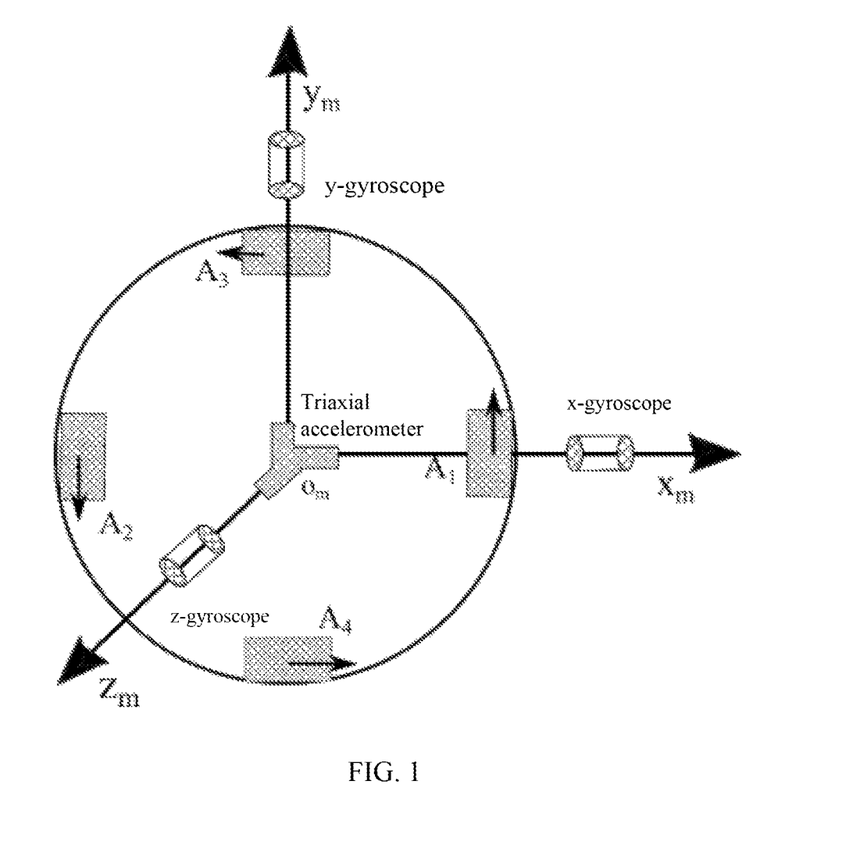
FIG. 1 is an installation diagram of a sensor for angular and linear motions of a gravity gradiometer.

As shown in FIG. 1, A1, A2, A3 and A4 are four accelerometers disposed on a rotating accelerometer gravity gradiometer and sensitive elements for a gravitational gradient; the origin of a measurement coordinate system of the gravity gradiometer is located in the center of a disc, $x_m$ is an X axis of the measurement coordinate system of the gravity gradiometer, $y_m$ is a Y axis of the measurement coordinate system of the gravity gradiometer, and $z_m$ is a Z axis of the measurement coordinate system of the gravity gradiometer; a triaxial accelerometer is disposed at a center point of a rotating disc of the gravity gradiometer to record the linear motion of the gravity gradiometer; and three coordinate axes of the measurement coordinate system of the gravity gradiometer are respectively provided with a gyroscope to record angular motions (angular velocity and angular acceleration) of the gravity gradiometer.

Figure 2:
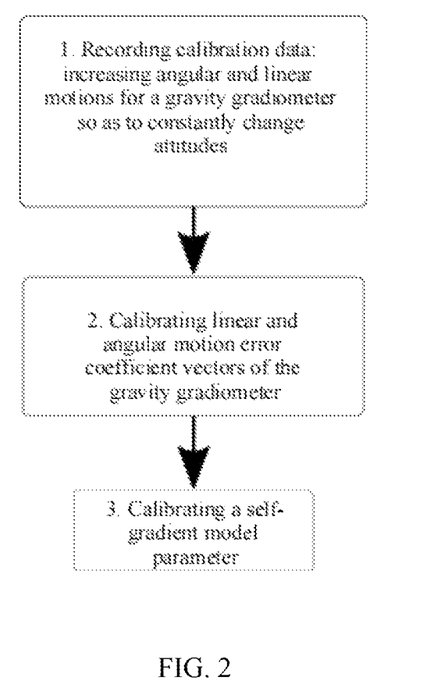
FIG. 2 is the calibration process of a rotating accelerometer gravity gradiometer.

As shown in FIG. 2, a calibration method for a rotating accelerometer gravity gradiometer, the method comprising the following steps:

(1) applying linear and angular motions to the rotating accelerometer gravity gradiometer, and meanwhile continuously changing the attitudes of the gravity gradiometer, and recording linear motions ($a_x,a_y,a_z$), angular motions ($\omega_x,\omega_y,\omega_z,\omega_{ax},\omega_{ay},\omega_{az}$), the attitudes ($\theta_x,\theta_y,\theta_z$) and an output ($G_{out}$) of the gravity gradiometer as calibrated data, wherein start time for the calibrated data is $t_1$, end time is $t_p$, and the linear motion data of the gravity gradiometer is as follows:

$$\begin{cases} a_x = [a_x(t_1), \ldots, a_x(t), \ldots, a_x(t_p)]^T \\ a_y = [a_y(t_1), \ldots, a_y(t), \ldots, a_y(t_p)]^T \\ a_z = [a_z(t_1), \ldots, a_z(t), \ldots, a_z(t_p)]^T \end{cases}$$

where, $a_x$ represents acceleration data in an X direction of a measurement coordinate system of the gravity gradiometer, and $a_x(t_1)$ represents an acceleration in the X direction of the measurement coordinate system of the gravity gradiometer at the time $t_1$; $a_x(t)$ represents an acceleration in the X direction of the measurement coordinate system of the gravity gradiometer at time t; $a_x(t_2)$ represents an acceleration in the X direction of the measurement coordinate system of the gravity gradiometer at the time $t_2$; $a_y$ represents acceleration data in a Y direction of the measurement coordinate system of the gravity gradiometer, and $a_y(t_1)$ represents an acceleration in the Y direction of the measurement coordinate system of the gravity gradiometer at the time $t_1$; $a_y(t)$ represents an acceleration in the Y direction of the measurement coordinate system of the gravity gradiometer at the time t; $a_y(t_2)$ represents an acceleration in the Y direction of the measurement coordinate system of the gravity gradiometer at the time $t_2$; $a_z$ represents acceleration data in a Z direction of the measurement coordinate system of the gravity gradiometer, and $a_z(t_1)$ represents an acceleration in the Z direction of the measurement coordinate system of the gravity gradiometer at the time $t_1$; $a_z(t)$ represents an acceleration in the Z direction of the measurement coordinate system of the gravity gradiometer at the time t; $a_z(t_2)$ represents an acceleration in the Z direction of the measurement coordinate system of the gravity gradiometer at the time $t_2$; where, $[\bullet]^T$ represents transposed operation; the angular motion data of the gravity gradiometer is as follows:

$$\begin{cases} \omega_x = [\omega_x(t_1), \ldots, \omega_x(t), \ldots, \omega_x(t_p)]^T \\ \omega_y = [\omega_y(t_1), \ldots, \omega_y(t), \ldots, \omega_y(t_p)]^T \\ \omega_z = [\omega_z(t_1), \ldots, \omega_z(t), \ldots, \omega_z(t_p)]^T \end{cases}$$

$$\begin{cases} \omega_{ax} = [\omega_{ax}(t_1), \ldots, \omega_{ax}(t), \ldots, \omega_{ax}(t_p)]^T \\ \omega_{ay} = [\omega_{ay}(t_1), \ldots, \omega_{ay}(t), \ldots, \omega_{ay}(t_p)]^T \\ \omega_{az} = [\omega_{az}(t_1), \ldots, \omega_{az}(t), \ldots, \omega_{az}(t_p)]^T \end{cases}$$

where, $\omega_x$ represents angular velocity data in the X direction of the measurement coordinate system of the gravity gradiometer, $\omega_x(t_1)$ represents an angular velocity in the X direction of the measurement coordinate system of the gravity gradiometer at the start time $t_1$, $\omega_x(t)$ represents an angular velocity in the X direction of the measurement coordinate system of the gravity gradiometer at the time t; $\omega_x(t_p)$ represents an angular velocity in the X direction of the measurement coordinate system of the gravity gradiometer at the end time $t_p$;

$\omega_y$ represents angular velocity data in the Y direction of the measurement coordinate system of the gravity gradiometer, $\omega_y(t_1)$ represents an angular velocity in the Y direction of the measurement coordinate system of the gravity gradiometer at the start time $t_1$, $\omega_y(t)$ represents an angular velocity in the Y direction of the measurement coordinate system of the gravity gradiometer at the time t, and $\omega_y(t_p)$ represents an angular velocity in the Y direction of the measurement coordinate system of the gravity gradiometer at the end time $t_p$;

$\omega_z$ represents angular velocity data in the Z direction of the measurement coordinate system of the gravity gradiometer, $\omega_z(t_1)$ represents an angular velocity in the Z direction of the measurement coordinate system of the gravity gradiometer at the start time $t_1$, $\omega_z(t)$ represents an angular velocity in the Z direction of the measurement coordinate system of the gravity gradiometer at the time t, and $\omega_z(t_p)$ represents an angular velocity in the Z direction of the measurement coordinate system of the gravity gradiometer at the end time $t_p$;

$\omega_{ax}$ represents angular acceleration data in the X direction of the measurement coordinate system of the gravity gradiometer, $\omega_{ax}(t_1)$ represents an angular acceleration in the X direction of the measurement coordinate system of the gravity gradiometer at the start time $t_1$, $\omega_{ax}(t)$ represents an angular acceleration in the X direction of the measurement coordinate system of the gravity gradiometer at the time t, and $\omega_{ax}(t_p)$ represents an angular acceleration in the X direction of the measurement coordinate system of the gravity gradiometer at the end time $t_p$; $\omega_{ay}$ represents angular acceleration data in the Y direction of the measurement coordinate system of the gravity gradiometer, $\omega_{ay}(t_1)$ represents an angular acceleration in the Y direction of the measurement coordinate system of the gravity gradiometer at the start time $t_1$, $\omega_{ay}(t)$ represents an angular acceleration in the Y direction of the measurement coordinate system of the gravity gradiometer at the time t, and $\omega_{ay}(t_p)$ represents an angular acceleration in the Y direction of the measurement coordinate system of the gravity gradiometer at the end time $t_p$; $\omega_{az}$ represents angular acceleration data in the Z direction of the measurement coordinate system of the gravity gradiometer, $\omega_{az}(t_1)$ represents an angular acceleration in the Z direction of the measurement coordinate system of the gravity gradiometer at the start time $t_1$, $\omega_{az}(t)$ represents an angular acceleration in the Z direction of the measurement coordinate system of the gravity gradiometer at the time t, and $\omega_{az}(t_p)$ represents an angular acceleration in the Z direction of the measurement coordinate system of the gravity gradiometer at the end time $t_p$; the attitude data of the gravity gradiometer is as follows:

$$\begin{cases} \theta_x = [\theta_x(t_1), \ldots, \theta_x(t), \ldots, \theta_x(t_p)]^T \\ \theta_y = [\theta_y(t_1), \ldots, \theta_y(t), \ldots, \theta_y(t_p)]^T \\ \theta_z = [\theta_z(t_1), \ldots, \theta_z(t), \ldots, \theta_z(t_p)]^T \end{cases}$$

where, $\sigma_x$ represents attitude angle data of a rotation around the X axis, $\theta_a(t_1)$ represents an attitude angle of the rotation around the X axis at the start time $t_1$, $\theta_x(t)$ represents an attitude angle of the rotation around the X axis at the time t, and $\theta_x(t_p)$ represents an attitude angle of the rotation around the X axis at the end time $t_p$; $\theta_y$ represents attitude angle data of a rotation around the Y axis, $\theta_y(t_1)$ represents an attitude angle of the rotation around the Y axis at the start time $t_1$, $\theta_y(t)$ represents an attitude angle of the rotation around the X axis at the time t, and $\theta_y(t_p)$ represents an attitude angle of the rotation around the X axis at the end time $t_p$; $\theta_z$ represents attitude angle data of a rotation around the Z axis, $\theta_z(t_1)$ represents an attitude angle of the rotation around the Z axis at the start time $t_1$, $\theta_z(t)$ represents an attitude angle of the rotation around the Z axis at the time t, and $\theta_z(t_p)$ represents an attitude angle of the rotation around the Z axis at the end time $t_p$;

output data of the gravity gradiometer is as follows:

$$G_{out} = [G_{out}(t_1), \ldots, G_{out}(t), \ldots, G_{out}(t_p)]$$

where, $G_{out}$ is the output data of the gravity gradiometer, $G_{out}(t_1)$ represents an output of the gravity gradiometer at the start time $t_1$, $G_{out}(t)$ represents an output of the gravity gradiometer at the time t, and $G_{out}(t_p)$ represents an output of the gravity gradiometer at the time $t_p$;

(2) calibrating a linear motion error coefficient vector $C_m$, an angular motion error coefficient vector $C_A$ and a scale factor $k_{ggi}$ of the rotating accelerometer gravity gradiometer based on the following formula;

(2-1). calculating linear and angular motion vectors at all times based on the following formula:

$$L_m(t) = \begin{bmatrix} a_x(t)a_y(t)\sin 2\Omega t + 0.5(a_x^2(t) - a_y^2(t))\cos 2\Omega t \\ a_x(t)a_y(t)\cos 2\Omega t - 0.5(a_x^2(t) - a_y^2(t))\sin 2\Omega t \\ a_x(t)\sin\Omega t - a_y(t)\cos\Omega t \\ a_y(t)\sin\Omega t + a_x(t)\cos\Omega t \\ a_x(t)a_z(t)\sin\Omega t - a_y(t)a_z(t)\cos\Omega t \\ a_y(t)a_z(t)\sin\Omega t + a_x(t)a_z(t)\cos\Omega t \\ 0.5(a_x^2(t) + a_y^2(t)) \\ a_z^2(t) \\ a_z(t) \\ 1 \end{bmatrix},$$

$$L_a(t) = \begin{bmatrix} -0.5(\omega_x^2(t) - \omega_y^2(t))\sin 2\Omega t + \omega_x(t)\omega_y(t)\cos 2\Omega t \\ \omega_x(t)\omega_y(t)\sin 2\Omega t + 0.5(\omega_x^2(t) - \omega_y^2(t))\cos 2\Omega t \\ \omega_x(t)\omega_z(t)\sin\Omega t - \omega_y(t)\omega_z(t)\cos\Omega t \\ \omega_y(t)\omega_z(t)\sin\Omega t + \omega_x(t)\omega_z(t)\cos\Omega t \\ \omega_{ax}(t)\sin\Omega t - \omega_{ay}(t)\cos\Omega t \\ \omega_{ay}(t)\sin\Omega t + \omega_{ax}(t)\cos\Omega t \\ \omega_{az}(t) \\ 0.5(\omega_x^2(t) + \omega_y^2(t) + 2\omega_z^2(t)) \end{bmatrix}$$

where, $L_m(t)$ represents a linear motion vector at the time t, $L_a(t)$ represents an angular motion vector at the time t, and $a_x(t), a_y(t), a_z(t)$ represents a linear motion data at the time t; $\omega_x(t), \omega_y(t), \omega_z(t), \omega_{ax}(t), \omega_{ay}(t)$, and $\omega_{az}(t)$ represent angular motion data at the time t, and $\Omega$ represents an angular frequency of a rotating disc of the rotating accelerometer gravity gradiometer;

(2-2). substituting the linear motion vectors and the angular motion vectors at all times into the following formula to calculate a motion matrix L;

$$L = \begin{bmatrix} L_m(t_1), \ldots, L_m(t), \ldots L_m(t_p) \\ L_a(t_1), \ldots, L_a(t), \ldots L_a(t_p) \end{bmatrix}$$

where, $L_m(t_1)$ represents a linear motion vector at the start time $t_1$, $L_m(t)$ represents a linear motion vector at the time t, and $L_m(t_p)$ represents a linear motion vector at the end time $t_p$; $L_a(t_1)$ represents an angular motion vector at the start time $t_1$, $L_a(t)$ represents an angular motion vector at the time t, and $L_a(t_p)$ represents an angular motion vector at the end time $t_p$;

(2-3). Calibrating the linear motion error coefficient vector $C_m$ and the angular motion error coefficient vector $C_A$ based on the following formula, wherein $C_m$ is 1×10 vectors, and $C_A$ is 1×8 vectors:

$$[C_m, C_A] = G_{out} \cdot L^+$$

where, $G_{out}$ is an output of the rotating accelerometer gravity gradiometer, and $L^+$ represents a generalized inverse of the matrix L; the scale factor $k_{ggi}$ of the gravity gradiometer is equal to a first element of the angular motion error coefficient vector $C_A$, namely $k_{ggi} = C_A(1)$;

(3) Calibrating a self-gradient model parameter based on the following formula:

(3-1). Calculating modulation vectors at all times based on the following formula $$C_{ref}(t) = [\sin 2\Omega t, \cos 2\Omega t]$$

$C_{ref}(t)$ represents a modulation vector at the time t;

(3-2). Substituting the attitude data into the following formula to calculate attitude characteristic parameters at all times;

$$\begin{cases} a_{1,1}(t) = c^2\theta_y(t), \ a_{1,2}(t) = 0, \ a_{1,3}(t) = -2c\theta_y(t)s\theta_y(t), \ a_{1,4}(t) = -1, \ a_{1,5}(t) = 0, \\ a_{1,6}(t) = s^2\theta_y(t), \ a_{1,7}(t) = c^2\theta_y(t), \ a_{1,8}(t) = 2c\theta_y(t)s\theta_y(t)s\theta_x(t), \\ a_{1,9}(t) = -2c\theta_x(t)c\theta_y(t)s\theta_y(t), \ a_{1,10}(t) = -c^2\theta_x(t) + s^2\theta_x(t)s^2\theta_y(t), \\ a_{1,11} = -2c\theta_x s\theta_x s^2\theta_y(t) - 2c\theta_x(t)s\theta_x(t), \ a_{1,12} = c^2\theta_x(t)s^2\theta_y(t) - s^2\theta_x(t) \\ a_{1,13}(t) = -c\theta_y(t)s\theta_x(t)s\theta_y(t)s2\theta_z(t) + 0.5[c^2\theta_x(t) + c^2\theta_y(t) - s^2\theta_x(t)s^2\theta_y(t)]c2\theta_z(t) \\ \qquad -0.5[c^2\theta_x(t)s^2\theta_y(t) - s^2\theta_x(t)] \\ a_{1,14}(t) = [c^2\theta_x(t)c^2\theta_y(t) - s^2\theta_x s^2\theta_y(t)]s2\theta_z(t) + 2c\theta_y(t)s\theta_x(t)s\theta_y(t)c2\theta_z(t) \\ a_{1,15}(t) = 2[c\theta_x(t)s\theta_x(t)s^2\theta_y(t) + c\theta_x(t)s\theta_x(t)]s\theta_z(t) - 2c\theta_x(t)c\theta_y(t)s\theta_y(t)c\theta_z(t) \\ a_{1,16}(t) = c\theta_y(t)s\theta_x(t)s\theta_y(t)s2\theta_z(t) + 0.5[s^2\theta_x(t)s^2\theta_y(t) - c^2\theta_x(t) - c^2\theta_y(t)]c2\theta_z(t) \\ \qquad -0.5[c^2\theta_x(t)s^2\theta_y(t) - s^2\theta_x(t)] \\ a_{1,17}(t) = -2c\theta_x(t)c\theta_y(t)s\theta_y(t)s\theta_z(t) - 2[c\theta_x(t)s\theta_x(t)s^2\theta_y(t) + c\theta_x(t)s\theta_x(t)]c\theta_z(t) \\ a_{1,18}(t) = c^2\theta_x(t)s^2\theta_y(t) - s^2\theta_x(t) \end{cases}$$

$$\begin{cases} a_{2,1}(t) = 0, \ a_{2,2}(t) = c\theta_y(t), \ a_{2,3}(t) = 0, \ a_{2,4}(t) = 0, \ a_{2,5}(t) = -s\theta_y(t), \ a_{2,6}(t) = 0, \ a_{2,7}(t) = 0, \\ a_{2,8}(t) = c\theta_x(t)c\theta_y(t), \ a_{2,9}(t) = c\theta_y(t)s\theta_x(t), \ a_{2,10}(t) = c\theta_x(t)\theta_x(t)s\theta_y(t), \\ a_{2,11}(t) = s\theta_y(t)[s^2\theta_x(t) - c^2\theta_x(t)], \ a_{2,12}(t) = -c\theta_x(t)s\theta_x(t)s\theta_y(t), \\ a_{2,13}(t) = -0.5c\theta_x(t)c\theta_y(t)s2\theta_z(t) - 0.5c\theta_x(t)s\theta_x(t)s\theta_y(t)c2\theta_z(t) + 0.5c\theta_x(t)s\theta_x(t)s\theta_y(t) \\ a_{2,14}(t) = -c\theta_x(t)s\theta_x(t)s\theta_y(t)s2\theta_z(t) + c\theta_x(t)c\theta_y(t)c2\theta_z(t) \\ a_{2,15}(t) = [s\theta_y(t)c^2\theta_x(t) - s\theta_y(t)s^2\theta_x(t)]s\theta_z(t) + c\theta_y(t)s\theta_x(t)c\theta_z(t) \\ a_{2,16}(t) = 0.5c\theta_x(t)c\theta_y(t)s2\theta_z(t) + 0.5c\theta_x(t)s\theta_x(t)s\theta_y(t)c2\theta_z(t) + 0.5c\theta_x(t)s\theta_x(t)s\theta_y(t) \\ a_{2,17}(t) = c\theta_y(t)s\theta_x(t)s\theta_z(t) + [s\theta_y(t)s^2\theta_x(t) - s\theta_y(t)c^2\theta_x(t)]c\theta_z(t) \\ a_{2,18}(t) = -c\theta_x(t)s\theta_x(t)s\theta_y(t) \end{cases}$$

where, $c, c^2$ represent $\cos(\ ), \cos^2(\ )$ respectively, and $s, s^2$ represent $\sin(\ ), \sin^2(\ )$ respectively; $\theta_x(t), \theta_y(t), \theta_z(t)$ represents an attitude at the time t, and $a_{1,1}(t), \ldots, a_{1,18}(t), a_{2,1}(t), \ldots, a_{2,18}(t)$ are attitude characteristic parameters at the time t;

(3-3). Substituting the calculated calculate attitude characteristic parameters into the following formula to calculate attitude characteristic matrices at all times;

$$A_{attu}(t) = \begin{bmatrix} a_{1,1}(t) & \cdots & a_{1,18}(t) \\ a_{2,1}(t) & \cdots & a_{2,18}(t) \end{bmatrix}$$

where, $A_{attu}(t)$ represents an attitude characteristic matrix at the time t, and $A_{attu}(t)$ is 2×18 matrices;

(3-4). Calibrating the self-gradient model parameter of the gravity gradiometer based on the following formula:

$$P = \frac{1}{C_A(1)} \begin{bmatrix} C_{ref}(t_1)A_{attu}(t_1) \\ \vdots \\ C_{ref}(t)A_{attu}(t) \\ \vdots \\ C_{ref}(t_p)A_{attu}(t_p) \\ 1,0,0,1,0,1,0,0,0,0,0,0,0,0,0,0,0,0 \\ 0,0,0,0,0,0,1,0,0,1,0,1,0,0,0,0,0,0 \\ 0,0,0,0,0,0,0,0,0,0,0,1,0,0,1,0,1,0,0,0 \end{bmatrix}^+ \begin{bmatrix} G_{out}(t_1) - [C_m, C_A]\begin{bmatrix} L_m(t_1) \\ L_a(t_1) \end{bmatrix} \\ \vdots \\ G_{out}(t) - [C_m, C_A]\begin{bmatrix} L_m(t) \\ L_a(t) \end{bmatrix} \\ \vdots \\ G_{out}(t_p) - [C_m, C_A]\begin{bmatrix} L_m(t_p) \\ L_a(t_p) \end{bmatrix} \\ 0 \\ 0 \\ 0 \end{bmatrix}$$

where, P represents the calibrated self-gradient model parameter, $C_m$ represents the calibrated linear motion error coefficient vector in the step 2), $C_A$ is the calculated angular motion error coefficient vector in the step 2), and $C_A(1)$ is the first element of the angular motion error coefficient vector; $L_m(t_1)$ is a linear motion vector at the start time $t_1$, $L_m(t)$ is a linear motion vector at the time t, and $L_m(t_p)$ is a linear motion vector at the end time $t_p$; $L_a(t)$ is an angular motion vector at the time t, $L_a(t_1)$ is an angular motion vector at the start time $t_1$, and $L_a(t_p)$ is an angular motion vector at the end time $t_p$; $C_{ref}(t)$ is a modulation vector at the time t, $C_{ref}(t_1)$ is a modulation vector at the start time $t_1$, and $C_{ref}(t_p)$ is a modulation vector at the end time $t_p$; and $A_{attu}(t)$ is an attitude characteristic matrix at the time t, $A_{attu}(t_1)$ is an attitude characteristic matrix at the start time $t_1$, and $A_{attu}(t_p)$ is an attitude characteristic matrix at the end time $t_p$.

Contents not elaborated in the Description of the present invention belong to the prior art known by those of skill in the art, and the foregoing embodiments are only the preferred implementations of the present invention. It should be noted that, for those of skill ordinary in the art, may make some improvements and equivalent replacements without departing from the principle of the present invention. These technical solutions which make improvements and equivalent replacements for the claims of the present invention fall into the protection scope of the present invention.

What is claimed is:

1. A calibration method for a rotating accelerometer gravity gradiometer, the rotating accelerometer gravity gradiometer undergoing calibration comprises four accelerometers, an origin of a measurement coordinate system is located in a center of a disc, and the three coordinate axes of the measurement coordinate system of the gravity gradiometer are each provided with a gyroscope and an axial accelerometer configured to record the angular velocity and the linear motion along each respective axis, the calibration method comprising the following steps:

1) changing the linear motions and angular motions to the rotating accelerometer gravity gradiometer undergoing calibration, and meanwhile continuously changing attitudes of the rotating accelerometer gravity gradiometer undergoing calibration, and recording linear motions $(a_x, a_y, a_z)$ with the accelerometers, angular motions $(\omega_x, \omega_y, \omega_z, \omega_{ax}, \omega_{ay}, \omega_{az})$ with the gyroscopes, the attitudes $(\theta_x, \theta_y, \theta_z)$ and an output $(G_{out})$ of the rotating accelerometer gravity gradiometer as calibrated data, wherein a start time for the calibrated data is $t_1$, an end time is $t_p$, and linear motion data of the rotating accelerometer gravity gradiometer are as follows:

$$\begin{cases} a_x = [a_x(t_1), \ldots, a_x(t), \ldots, a_x(t_p)]^T \\ a_y = [a_y(t_1), \ldots, a_y(t), \ldots, a_y(t_p)]^T \\ a_z = [a_z(t_1), \ldots, a_z(t), \ldots, a_z(t_p)]^T \end{cases}$$

wherein, $a_x$ represents acceleration data in an X direction of a measurement coordinate system of the rotating accelerometer gravity gradiometer, and $a_x(t_1)$ represents an acceleration in the X direction of the measurement coordinate system of the rotating accelerometer gravity gradiometer at the time $t_1$; $a_x(t)$ represents an acceleration in the X direction of the measurement coordinate system of the rotating accelerometer gravity gradiometer at time t; $a_x(t_p)$ represents an acceleration in the X direction of the measurement coordinate system of the rotating accelerometer gravity gradiometer at the time $t_p$;

$a_y$ represents acceleration data in a Y direction of the measurement coordinate system of the rotating accelerometer gravity gradiometer, and $a_y(t_1)$ represents an acceleration in the Y direction of the measurement coordinate system of the rotating accelerometer gravity gradiometer at the time $t_1$; $a_y(t)$ represents an acceleration in the Y direction of the measurement coordinate system of the rotating accelerometer gravity gradiometer at the time t; $a_y(t_p)$ represents an acceleration in the Y direction of the measurement coordinate system of the rotating accelerometer gravity gradiometer at the time $t_p$;

$a_z$ represents acceleration data in a Z direction of the measurement coordinate system of the rotating accelerometer gravity gradiometer, and $a_z(t_1)$ represents an acceleration in the Z direction of the measurement coordinate system of the rotating accelerometer gravity gradiometer at the time $t_1$; $a_z(t)$ represents an acceleration in the Z direction of the measurement coordinate system of the rotating accelerometer gravity gradiometer at the time t; $a_z(t_p)$ represents an acceleration in the Z direction of the measurement coordinate system of the rotating accelerometer gravity gradiometer at the time $t_p$;

where, $[\bullet]^T$ represents transposed operation;

angular motion data of the rotating accelerometer gravity gradiometer are as follows:

$$\begin{cases} \omega_x = [\omega_x(t_1), \ldots, \omega_x(t), \ldots, \omega_x(t_p)]^T \\ \omega_y = [\omega_y(t_1), \ldots, \omega_y(t), \ldots, \omega_y(t_p)]^T \\ \omega_z = [\omega_z(t_1), \ldots, \omega_z(t), \ldots, \omega_z(t_p)]^T \end{cases}$$

$$\begin{cases} \omega_{ax} = [\omega_{ax}(t_1), \ldots, \omega_{ax}(t), \ldots, \omega_{ax}(t_p)]^T \\ \omega_{ay} = [\omega_{ay}(t_1), \ldots, \omega_{ay}(t), \ldots, \omega_{ay}(t_p)]^T \\ \omega_{az} = [\omega_{az}(t_1), \ldots, \omega_{az}(t), \ldots, \omega_{az}(t_p)]^T \end{cases}$$

wherein, $\omega_x$ represents angular velocity data in the X direction of the measurement coordinate system of the rotating accelerometer gravity gradiometer, $\omega_x(t_1)$ represents an angular velocity in the X direction of the measurement coordinate system of the rotating accelerometer gravity gradiometer at the start time $t_1$, $\omega_x(t)$ represents an angular velocity in the X direction of the measurement coordinate system of the rotating accelerometer gravity gradiometer at the time t; $\omega_x(t_p)$ represents an angular velocity in the X direction of the measurement coordinate system of the rotating accelerometer gravity gradiometer at the end time $t_p$;

$\omega_y$ represents angular velocity data in the Y direction of the measurement coordinate system of the rotating accelerometer gravity gradiometer, $\omega_y(t_1)$ represents an angular velocity in the Y direction of the measurement coordinate system of the rotating accelerometer gravity gradiometer at the start time $t_1$, $\omega_y(t)$ represents an angular velocity in the Y direction of the measurement coordinate system of the rotating accelerometer gravity gradiometer at the time t, and $\omega_y(t_p)$ represents an angular velocity in the Y direction of the measurement coordinate system of the rotating accelerometer gravity gradiometer at the end time $t_p$;

$\omega_z$ represents angular velocity data in the Z direction of the measurement coordinate system of the rotating accelerometer gravity gradiometer, $\omega_z(t_1)$ represents an angular velocity in the Z direction of the measurement coordinate system of the rotating accelerometer gravity gradiometer at the start time $t_1$, $\omega_z(t)$ represents an angular velocity in the Z direction of the measurement coordinate system of the rotating accelerometer gravity gradiometer at the time t, and $\omega_z(t_p)$ represents an angular velocity in the Z direction of the measurement coordinate system of the rotating accelerometer gravity gradiometer at the end time $t_p$;

$\omega_{ax}$ represents angular acceleration data in the X direction of the measurement coordinate system of the rotating accelerometer gravity gradiometer, $\omega_{ax}(t_1)$ represents an angular acceleration in the X direction of the measurement coordinate system of the rotating accelerometer gravity gradiometer at the start time $t_1$, $\omega_{ax}(t)$ represents an angular acceleration in the X direction of the measurement coordinate system of the rotating accelerometer gravity gradiometer at the time t, and $\omega_{ax}(t_p)$ represents an angular acceleration in the X direction of the measurement coordinate system of the rotating accelerometer gravity gradiometer at the end time $t_p$;

$\omega_{ay}$ represents angular acceleration data in the Y direction of the measurement coordinate system of the rotating accelerometer gravity gradiometer, $\omega_{ay}(t_1)$ represents an angular acceleration in the Y direction of the measurement coordinate system of the rotating accelerometer gravity gradiometer at the start time $t_1$, $\omega_{ay}(t)$ represents an angular acceleration in the Y direction of the measurement coordinate system of the rotating accelerometer gravity gradiometer at the time t, and $\omega_{ay}(t_p)$ represents an angular acceleration in the Y direction of the measurement coordinate system of the rotating accelerometer gravity gradiometer at the end time $t_p$;

$\omega_{az}$ represents angular acceleration data in the Z direction of the measurement coordinate system of the rotating accelerometer gravity gradiometer, $\omega_{az}(t_1)$ represents an angular acceleration in the Z direction of the measurement coordinate system of the rotating accelerometer gravity gradiometer at the start time $t_1$, $\omega_{az}(t)$ represents an angular acceleration in the Z direction of the measurement coordinate system of the rotating accelerometer gravity gradiometer at the time t, and $\omega_{az}(t_p)$ represents an angular acceleration in the Z direction of the measurement coordinate system of the rotating accelerometer gravity gradiometer at the end time $t_p$;

the attitude data of the gravity gradiometer are as follows:

$$\begin{cases} \theta_x = [\theta_x(t_1), \ldots, \theta_x(t), \ldots, \theta_x(t_p)]^T \\ \theta_y = [\theta_y(t_1), \ldots, \theta_y(t), \ldots, \theta_y(t_p)]^T \\ \theta_z = [\theta_z(t_1), \ldots, \theta_z(t), \ldots, \theta_z(t_p)]^T \end{cases}$$

wherein, $\theta_x$ represents attitude angle data of a rotation around the X axis, $\theta_x(t_1)$ represents an attitude angle of the rotation around the X axis at the start time $t_1$, $\theta_x(t)$ represents an attitude angle of the rotation around the X axis at the time t, and $\theta_x(t_p)$ represents an attitude angle of the rotation around the X axis at the end time $t_p$;

$\theta_y$ represents attitude angle data of a rotation around the Y axis, $\theta_y(t_1)$ represents an attitude angle of the rotation around the Y axis at the start time $t_1$, $\theta_y(t)$ represents an attitude angle of the rotation around the X axis at the time t, and $\theta_y(t_p)$ represents an attitude angle of the rotation around the X axis at the end time $t_p$;

$\theta_z$ represents attitude angle data of a rotation around the Z axis, $\theta_z(t_1)$ represents an attitude angle of the rotation around the Z axis at the start time $t_1$, $\theta_z(t)$ represents an attitude angle of the rotation around the Z axis at the time t, and $\theta_z(t_p)$ represents an attitude angle of the rotation around the Z axis at the end time $t_p$;

output data of the rotating accelerometer gravity gradiometer is as follows:

$G_{out} = [G_{out}(t_1), \ldots, G_{out}(t), \ldots, G_{out}(t_p)]$ wherein, $G_{out}$ is the output data of the rotating accelerometer gravity gradiometer, $G_{out}(t_1)$ represents an output of the rotating accelerometer gravity gradiometer at the start time $t_1$, $G_{out}(t)$ represents an output of the rotating accelerometer gravity gradiometer at the time t, and $G_{out}(t_p)$ represents an output of the rotating accelerometer gravity gradiometer at the time $t_p$;

2) calibrating a linear motion error coefficient vector $C_m$, an angular motion error coefficient vector $C_A$ and a scale factor $k_{ggi}$ of the rotating accelerometer gravity gradiometer based on the following steps;

2-1) calculating linear motion vectors and angular motion vectors at all times based on the following formula:

$$L_m(t) = \begin{bmatrix} a_x(t)a_y(t)\sin 2\Omega t + 0.5(a_x^2(t) - a_y^2(t))\cos 2\Omega t \\ a_x(t)a_y(t)\cos 2\Omega t - 0.5(a_x^2(t) - a_y^2(t))\sin 2\Omega t \\ a_x(t)\sin \Omega t - a_y(t)\cos \Omega t \\ a_y(t)\sin \Omega t + a_x(t)\cos \Omega t \\ a_x(t)a_z(t)\sin \Omega t - a_y(t)a_z(t)\cos \Omega t \\ a_y(t)a_z(t)\sin \Omega t + a_x(t)a_z(t)\cos \Omega t \\ 0.5(a_x^2(t) + a_y^2(t)) \\ a_z^2(t) \\ a_z(t) \\ 1 \end{bmatrix},$$

$$L_a(t) = \begin{bmatrix} -0.5(\omega_x^2(t) - \omega_y^2(t))\sin 2\Omega t + \omega_x(t)\omega_y(t)\cos 2\Omega t \\ \omega_x(t)\omega_y(t)\sin 2\Omega t + 0.5(\omega_x^2(t) - \omega_y^2(t))\cos 2\Omega t \\ \omega_x(t)\omega_z(t)\sin \Omega t - \omega_y(t)\omega_z(t)\cos \Omega t \\ \omega_y(t)\omega_z(t)\sin \Omega t + \omega_x(t)\omega_z(t)\cos \Omega t \\ \omega_{ax}(t)\sin \Omega t - \omega_{ay}(t)\cos \Omega t \\ \omega_{ay}(t)\sin \Omega t + \omega_{ax}(t)\cos \Omega t \\ \omega_{az}(t) \\ 0.5(\omega_x^2(t) + \omega_y^2(t) + 2\omega_z^2(t)) \end{bmatrix}$$

wherein, $L_m(t)$ represents a linear motion vector at the time t, $L_a(t)$ represents an angular motion vector at the time t, and $a_x(t), a_y(t), a_z(t)$ represents a linear motion data at the time t; $\omega_x(t)$, $\omega_y(t)$, $\omega_z(t)$, $\omega_{ax}(t)$, $\omega_{ay}(t)$, and $\omega_{az}(t)$ represent angular motion data at the time t, and $\Omega$ represents an angular frequency of a rotating disc of the rotating accelerometer gravity gradiometer;

2-2) substituting the linear motion vectors and the angular motion vectors at all times into the following formula to calculate a motion matrix L;

$$L = \begin{bmatrix} L_m(t_1), \ldots, L_m(t), \ldots L_m(t_p) \\ L_a(t_1), \ldots, L_a(t), \ldots L_a(t_p) \end{bmatrix}$$

where, $L_m(t_1)$ represents a linear motion vector at the start time $t_1$, $L_m(t)$ represents the linear motion vector at the time t, and $L_m(t_p)$ represents a linear motion vector at the end time $t_p$; $L_a(t_1)$ represents an angular motion vector at the start time $t_1$, $L_a(t)$ represents the angular motion vector at the time t, and $L_a(t_p)$ represents an angular motion vector at the end time $t_p$;

2-3) calibrating the linear motion error coefficient vector $C_m$ and the angular motion error coefficient vector $C_A$ based on the following formula, wherein $C_m$ is 1×10 vectors, and $C_A$ is 1×8 vectors:

$[C_m, C_A] = G_{out} \cdot L^+$ wherein, $G_{out}$ is the output data of the rotating accelerometer gravity gradiometer, and $L^+$ represents a generalized inverse of the motion matrix L; the scale factor $k_{ggi}$ of the gravity gradiometer is equal to a first element of the angular motion error coefficient vector $C_A$, namely $k_{ggi} = C_A(1)$;

3) calibrating a self-gradient model parameter based on the following steps:

3-1) calculating modulation vectors at all times based on the following formula:

$C_{ref}(t) = [\sin 2\Omega t, \cos 2\Omega t]$ wherein, $C_{ref}(t)$ represents a modulation vector at the time t;

3-2) substituting the attitude data into the following formula to calculate attitude characteristic parameters at all times;

$$\begin{cases} a_{1,1}(t) = c^2\theta_y(t), a_{1,2}(t) = 0, a_{1,3}(t) = -2c\theta_y(t)s\theta_y(t), a_{1,4}(t) = \\ -1, a_{1,5}(t) = 0, \\ a_{1,6}(t) = s^2\theta_y(t), a_{1,7}(t) = c^2\theta_y(t), a_{1,8}(t) = 2c\theta_y(t)s\theta_y(t)s\theta_x(t), \\ a_{1,9}(t) = -2c\theta_x(t)c\theta_y(t)s\theta_y(t), a_{1,10} = -c^2\theta_x(t) + s^2\theta_x(t)s^2\theta_y(t), \\ a_{1,11} = -2c\theta_x s\theta_x s^2\theta_y(t) - 2c\theta_x(t)s\theta_x(t), a_{1,12} = \\ c^2\theta_x(t)s^2\theta_y(t) - s^2\theta_x(t) \\ a_{1,13}(t) = -c\theta_y(t)s\theta_x(t)s\theta_y(t)s2\theta_z(t) + 0.5[c^2\theta_x(t) + c^2\theta_y(t) - \\ s^2\theta_x(t)s^2\theta_y(t)]c2\theta_z(t) - 0.5[c^2\theta_x(t)s^2\theta_y(t) - s^2\theta_x(t)] \\ a_{1,14}(t) = [c^2\theta_x(t)c^2\theta_y(t) - s^2\theta_x(t)s^2\theta_y(t)]s2\theta_z(t) + \\ 2c\theta_y(t)s\theta_x(t)s\theta_y(t)c2\theta_z(t) \\ a_{1,15}(t) = 2[c\theta_x(t)s\theta_x(t)s^2\theta_y(t) + c\theta_x(t)s\theta_x(t)]s\theta_z(t) - \\ 2c\theta_x(t)c\theta_y(t)s\theta_y(t)c\theta_z(t) \\ a_{1,16}(t) = c\theta_y(t)s\theta_x(t)s\theta_y(t)s2\theta_z(t) + 0.5[s^2\theta_x(t)s^2\theta_y(t) - \\ c^2\theta_x(t) - c^2\theta_y(t)]c2\theta_z(t) - 0.5[c^2\theta_x(t)s^2\theta_y(t) - s^2\theta_x(t)] \\ a_{1,17}(t) = -2c\theta_x(t)c\theta_y(t)s\theta_y(t)s\theta_z(t) - 2[c\theta_x(t)s\theta_x(t)s^2\theta_y(t) + \\ c\theta_x(t)s\theta_x(t)]c\theta_z(t) \\ a_{1,18}(t) = c^2\theta_x(t)s^2\theta_y(t) - s^2\theta_x(t) \end{cases}$$

$$\begin{cases} a_{2,1}(t) = 0, a_{2,2}(t) = c\theta_y(t), a_{2,3}(t) = 0, a_{2,4}(t) = 0, a_{2,5}(t) = -s\theta_y(t), \\ a_{2,6}(t) = 0, a_{2,7}(t) = 0, \\ a_{2,8}(t) = c\theta_x(t)c\theta_y(t), a_{2,9}(t) = c\theta_y(t)s\theta_x(t), a_{2,10}(t) = c\theta_x(t)s\theta_x(t)s\theta_y(t), \\ a_{2,11}(t) = s\theta_y(t)[s^2\theta_x(t) - c^2\theta_x(t)], a_{2,12}(t) = -c\theta_x(t)s\theta_x(t)s\theta_y(t), \\ a_{2,13}(t) = -0.5c\theta_x(t)c\theta_y(t)s2\theta_z(t) - 0.5c\theta_x(t)s\theta_x(t)s\theta_y(t)c2\theta_z(t) + \\ 0.5c\theta_x(t)s\theta_x(t)s\theta_y(t) \\ a_{2,14}(t) = -c\theta_x(t)s\theta_x(t)s\theta_y(t)s2\theta_z(t) + c\theta_x(t)c\theta_y(t)c2\theta_z(t) \\ a_{2,15}(t) = [s\theta_y(t)c^2\theta_x(t) - s\theta_y(t)s^2\theta_x(t)]s\theta_z(t) + c\theta_y(t)s\theta_x(t)c\theta_z(t) \\ a_{2,16}(t) = 0.5c\theta_x(t)c\theta_y(t)s2\theta_z(t) + 0.5c\theta_x(t)s\theta_x(t)s\theta_y(t)c2\theta_z(t) + \\ 0.5c\theta_x(t)s\theta_x(t)s\theta_y(t) \\ a_{2,17}(t) = c\theta_y(t)s\theta_x(t)s\theta_z(t) + [s\theta_y(t)s^2\theta_x(t) - s\theta_y(t)c^2\theta_x(t)]c\theta_z(t) \\ a_{2,18}(t) = -c\theta_x(t)s\theta_x(t)s\theta_y(t) \end{cases}$$

where, $c, c^2$ represent $\cos(\ ), \cos^2(\ )$ respectively, and $s, s^2$ represent $\sin(\ ), \sin^2(\ )$ respectively; $\theta_x(t), \theta_y(t), \theta_z(t)$ represents an attitude at the time t, and $a_{1,1}(t), \ldots, a_{1,8}(t), a_{21}(t), \ldots, a_{2,18}(t)$ are attitude characteristic parameters at the time t;

3-3) substituting the calculated attitude characteristic parameters into the following formula to calculate attitude characteristic matrices at all times;

$$A_{attu}(t) = \begin{bmatrix} a_{1,1}(t) & \ldots & a_{1,18}(t) \\ a_{2,1}(t) & \ldots & a_{2,18}(t) \end{bmatrix}$$

where, $A_{attu}(t)$ represents an attitude characteristic matrix at the time t, and $A_{attu}(t)$ is 2×18 matrices;

3-4) calibrating the self-gradient model parameter of the rotating accelerometer gravity gradiometer based on the following formula:

$$P = \frac{1}{C_A(1)} \begin{bmatrix} C_{ref}(t_1)A_{attu}(t_1) \\ \vdots \\ C_{ref}(t)A_{attu}(t) \\ \vdots \\ C_{ref}(t_p)A_{attu}(t_p) \\ 1,0,0,1,0,1,0,0,0,0,0,0,0,0,0,0,0,0,0 \\ 0,0,0,0,0,0,1,0,0,1,0,1,0,0,0,0,0,0,0 \\ 0,0,0,0,0,0,0,0,0,0,0,1,0,0,1,0,1,0,0 \end{bmatrix}^+$$

$$\begin{bmatrix} G_{out}(t_1) - [C_m, C_A]\begin{bmatrix} L_m(t_1) \\ L_a(t_1) \end{bmatrix} \\ \vdots \\ G_{out}(t) - [C_m, C_A]\begin{bmatrix} L_m(t) \\ L_a(t) \end{bmatrix} \\ \vdots \\ G_{out}(t_p) - [C_m, C_A]\begin{bmatrix} L_m(t_p) \\ L_a(t_p) \end{bmatrix} \\ 0 \\ 0 \\ 0 \end{bmatrix}$$

wherein,

P represents a calibrated self-gradient model parameter, $C_m$ represents the linear motion error coefficient vector calibrated in the step 2, $C_A$ is the angular motion error coefficient vector calculated in the step 2, and $C_A(1)$ is the first element of the angular motion error coefficient vector;

$L_m(t_1)$ is the linear motion vector at the start time $t_1$, $L_m(t)$ is the linear motion vector at the time t, and $L_m(t_p)$ is the linear motion vector at the end time $t_p$; $L_a(t)$ is the angular motion vector at the time t, $L_a(t_1)$ is the angular motion vector at the start time $t_1$, and $L_a(t_p)$ is the angular motion vector at the end time $t_p$;

$C_{ref}(t)$ is the modulation vector at the time t, $C_{ref}(t_1)$ is a modulation vector at the start time $t_1$, and $C_{ref}(t_p)$ is a modulation vector at the end time $t_p$; and $A_{attu}(t)$ is the attitude characteristic matrix at the time t, $A_{attu}(t_1)$ is an attitude characteristic matrix at the start time $t_1$, and $A_{attu}(t_p)$ is an attitude characteristic matrix at the end time $t_p$, and calibrating the rotating accelerometer gravity gradiometer before a gravity field exploration by using the self-gradient model and the calculated calibration parameters thereby preventing saturation or damage to a circuit of the rotating accelerometer gravity gradiometer.

\* \* \* \* \*